(12) United States Patent
Salter

(10) Patent No.: US 6,170,994 B1
(45) Date of Patent: Jan. 9, 2001

(54) LEAD-IN BEVEL CONFIGURATION ON INNER OR OUTER RACE OF CYLINDRICAL ROLLER BEARING

(75) Inventor: Robert A. Salter, Morganton, NC (US)

(73) Assignee: American Roller Bearing Company, Pittsburgh, PA (US)

( * ) Notice: Under 35 U.S.C. 154(b), the term of this patent shall be extended for 0 days.

(21) Appl. No.: 09/342,950

(22) Filed: Jun. 29, 1999

(51) Int. Cl.⁷ ...................................................... F16C 33/58
(52) U.S. Cl. ................................................................ 384/569
(58) Field of Search .................................. 384/548, 559, 384/560, 564, 569

(56) References Cited

U.S. PATENT DOCUMENTS

| | | | |
|---|---|---|---|
| 1,865,796 | * | 7/1932 | Seifarth .................................. 384/560 |
| 4,336,996 | * | 6/1982 | Grandel ................................. 384/548 |
| 5,669,719 | * | 9/1997 | Kinno et al. ...................... 384/569 X |

FOREIGN PATENT DOCUMENTS

1102201 * 10/1955 (FR) ...................................... 384/564

* cited by examiner

*Primary Examiner*—Charles A Marmor
*Assistant Examiner*—Ankur Parekh
(74) *Attorney, Agent, or Firm*—Paul A. Beck & Associates

(57) ABSTRACT

The invention relates to a cylindrical roller bearing which allows the components to be assembled efficiently after they have been mounted in a machine. The cylindrical roller bearing has an inner race and an outer race and a plurality of rollers between the races. A bevel is on the inner race and is formed by a curved surface connecting an end face of the inner race to an outside diameter surface rollerpath of the inner race. The bevel may alternatively be formed of four or more flat surfaces which approximate a curved surface. The bevel can also be configured on the outer race as opposed to the inner race. This enables assembly of the rollers with respect to either the outer race or the inner race without scoring the rollerpath or the rollers.

Figure 1:
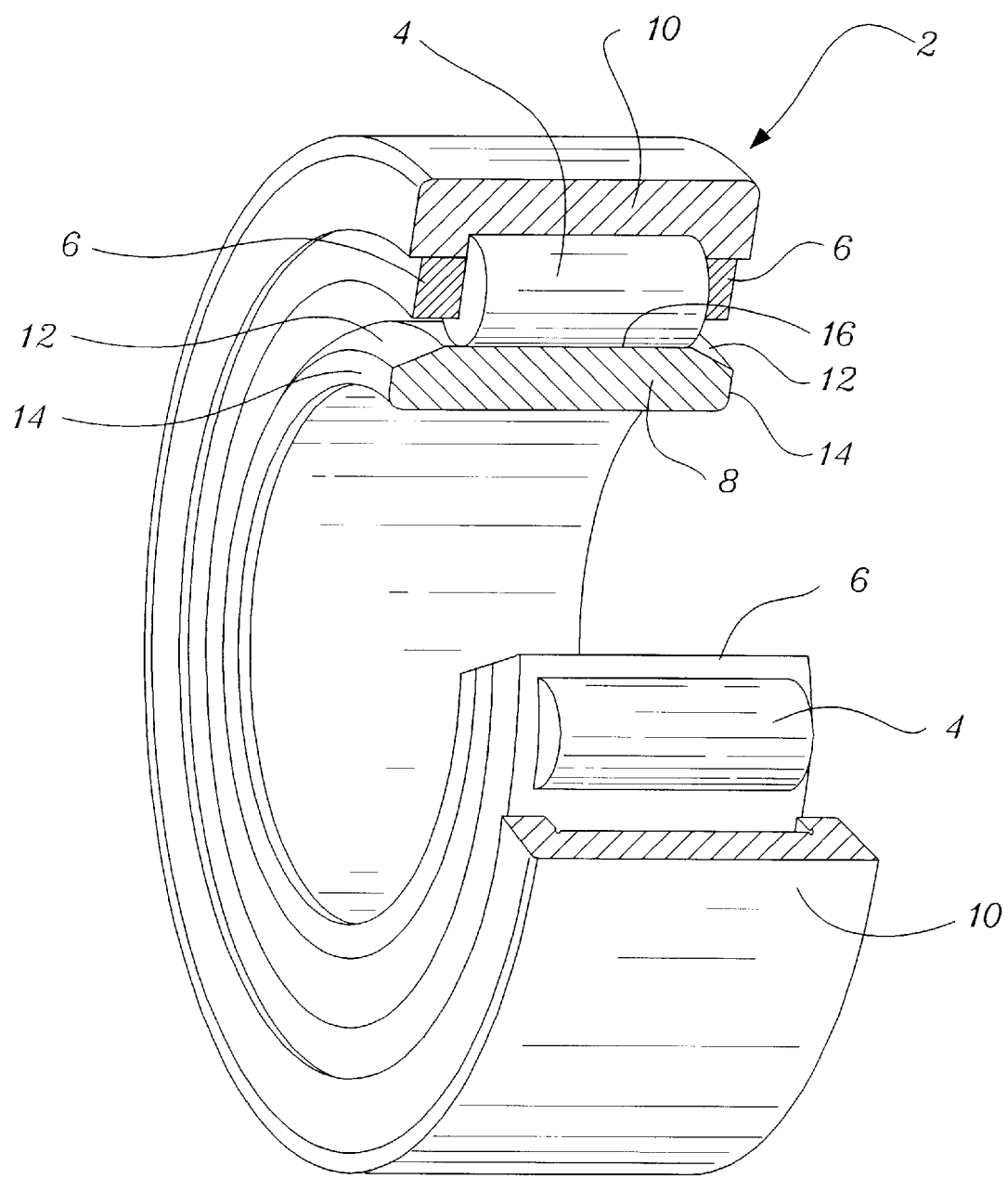

2 Claims, 5 Drawing Sheets

# LEAD-IN BEVEL CONFIGURATION ON INNER OR OUTER RACE OF CYLINDRICAL ROLLER BEARING

FIELD OF THE INVENTION

This invention relates to a cylindrical roller bearing which allows the components to be reassembled more efficiently after they have been separately mounted in a machine. The invention is an improvement to existing roller bearings.

BACKGROUND OF THE INVENTION

There are four basic types of radial rolling element bearings. There is the ball, spherical roller, tapered roller, and cylindrical roller. They are characterized by the shape of their rolling elements. The first two types are non-separable which means that they do not come apart in normal handling and machine assembly or disassembly. The latter two types are easily separable into an inner component and an outer component. For the user, being able to handle separate components makes it easier to tightly fit an inner race to a shaft and an outer race into a housing. The bearing components are then mated when the whole machine is assembled. For tapered roller bearings the open nature of a cup or outer race makes it very easy to assemble the machine and its bearings. Cylindrical roller bearings are somewhat more difficult to mate, especially when the bearings are large and the shaft and housing assemblies are heavy and cannot be lifted or manipulated by hand. In the design of a cylindrical roller bearing the internal clearance between a separable race and a sub-assembly consisting of the other race and rollers is only a few thousandths of an inch. A cage of the bearing functions to hold all of the rollers in the sub-assembly. Necessary clearances allow the rollers to drop as much as $\frac{1}{16}$th to $\frac{3}{32}$'s of an inch. For a typical and most commonly used style of roller bearings (designations "AD" and/or "NU") the "hole" which is the circumscribed diameter under the roller, must permit the inner race outside diameter to pass through it. The "hole" formed by the assembly is significantly smaller than the outside diameter of the inner race due to the previously described roller drop. It has been a common practice for decades to point the ends of inner races so that they will enter this "hole" and spread the rollers outward to allow completion of the assembly. The traditional method of pointing the inner race outside diameter over the years has been to machine a shallow angle or a chamfer on one or both ends of the inner race. This is done in the first step of manufacturing the part when the raw material is turned in a lathe to its approximate finished size and shape. The part is then heat treated to become very hard. Lathe turning would be difficult, so the part must be ground to its final dimensions. If the chamfer is properly designed for the bearing and stock removal, then its original machine surface can be left intact and will not require finished grinding, which is an additional expense. Chamfers are by definition a truncated conical surface of a specified single angle. Their simplicity makes them easy to lathe turn, or machine, particularly with older manual or mechanical automatic lathes, which has been performed by the prior art. In some special instances, prior art has changed from a single, constant angle chamfer to a two angle chamfer, approximately 20° and 30°. The prior art also has incorporated a small blend radius where the chamfer intersects a bearing end face. The major deficiency of the prior art design is that it has sharp corners where the two chamfers intersect and where the 20° chamfer intersects the outside diameter surface. The roller ends tend to catch on these breaks or sharp corners and halt the assembly of the roller bearing with the race and scratch the rollers and the race in the process. Various manufacturers have been putting radii and other corner shapes on boundary corners of the bearings and other components for many years. These outside corners have a different function from the lead-in chamfers and are not applicable to the solution addressed by the existing invention.

SUMMARY OF THE INVENTION

The invention has significant advantages over the existing structures. The present invention improves a method of configuring a lead-in bevel on bearing races. The lead-in configuration or bevel has a shape which allows more drop below the inner race outside diameter surface. This provides a smaller entrance diameter or point to enable easier entry into the inside "hole" which is defined by a diameter circumscribed by the rollers. The design of the invention reduces chances of scoring and scratching the precision surfaces. The shape of the inner race can be generated by a design so that it can economically be applied with existing manufacturing equipment.

One aspect of the design of the invention is the intrinsic consideration of stock removal and tolerances between the lathe turn dimensions and finished ground dimensions. This consideration incorporates anticipated distortions which occur in heat-treating. Specifically, the parts go out of round and out of flat between machining and grinding, which means that some portions of the end faces and the outside diameter will have more material removed than others. This affects the final dimensions of the bevel and which will vary somewhat around the part's axis. The design of the bevel seeks to minimize this variation and controls the minimum and maximum limits of its final dimensions.

The improved design bevel blends a rudimentary chamfer to the inner race outside diameter with a curved surface. The design provides a new combination of a straight line with tangential radii.

I provide a cylindrical roller bearing having an inner race and an outer race and a plurality of rollers between the races in which the improvement comprises a bevel on the inner race and formed by a curved surface connecting an end face of the inner race to an outside diameter surface which serves as a rollerpath of the inner race. The curved surface is a non-linear shape, having a slope that constantly changes as one advances along the contour of the curved surface. The curved surface can be an arc. The curved surface excludes approximations by flat surfaces of less than four individual or separate flat surfaces.

I also provide a cylindrical roller bearing having an inner race and an outer race and a plurality of rollers between the races in which the improvement comprises a bevel on the outer race and formed by a curved surface connecting an end face of the outer race to the inside diameter surface which serves as a rollerpath of the outer race. The curved surface also follows all of the contours as described above for the inner race.

A BRIEF DESCRIPTION OF THE DRAWINGS

Figure 2:
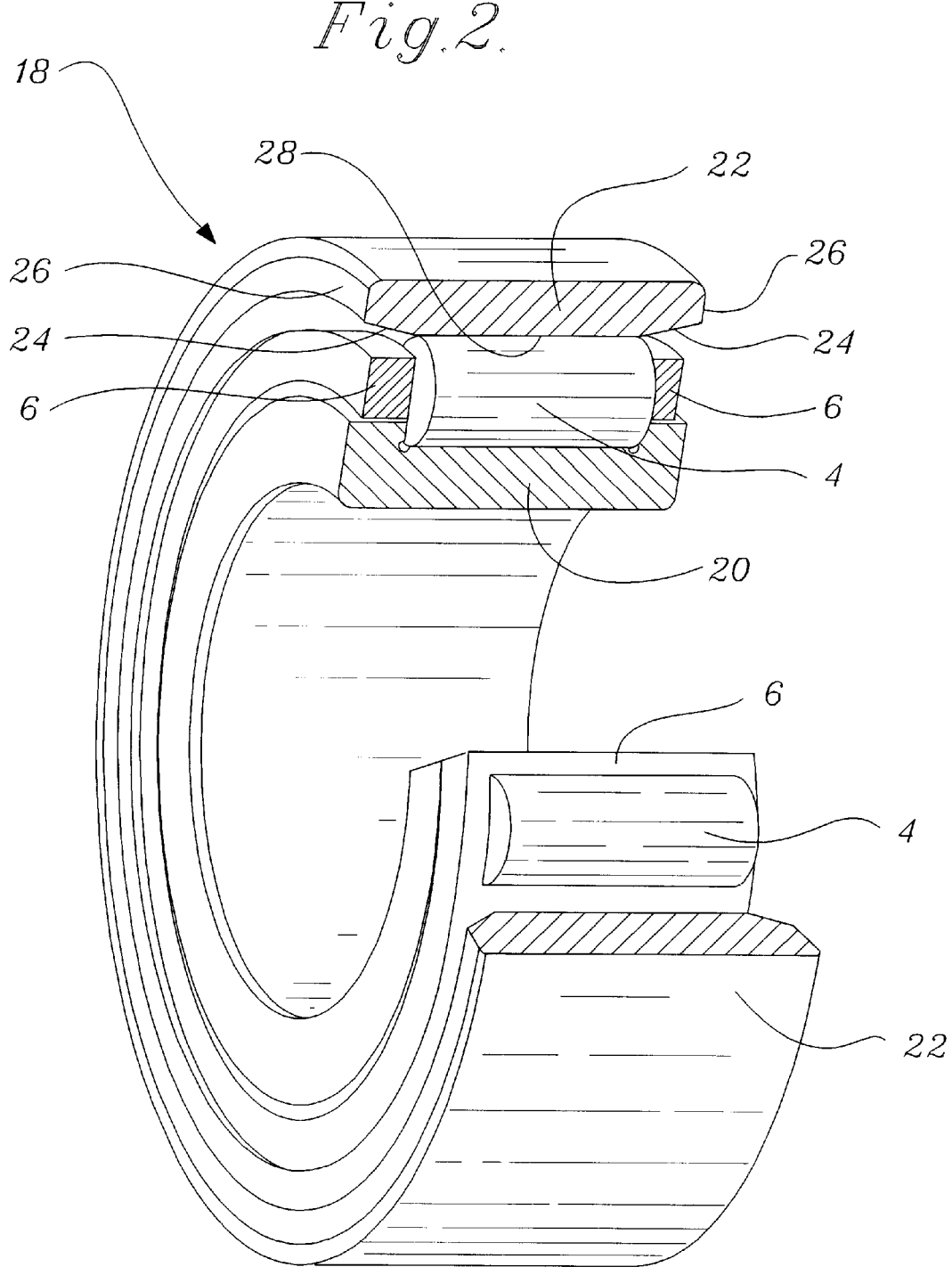
Figure 3:
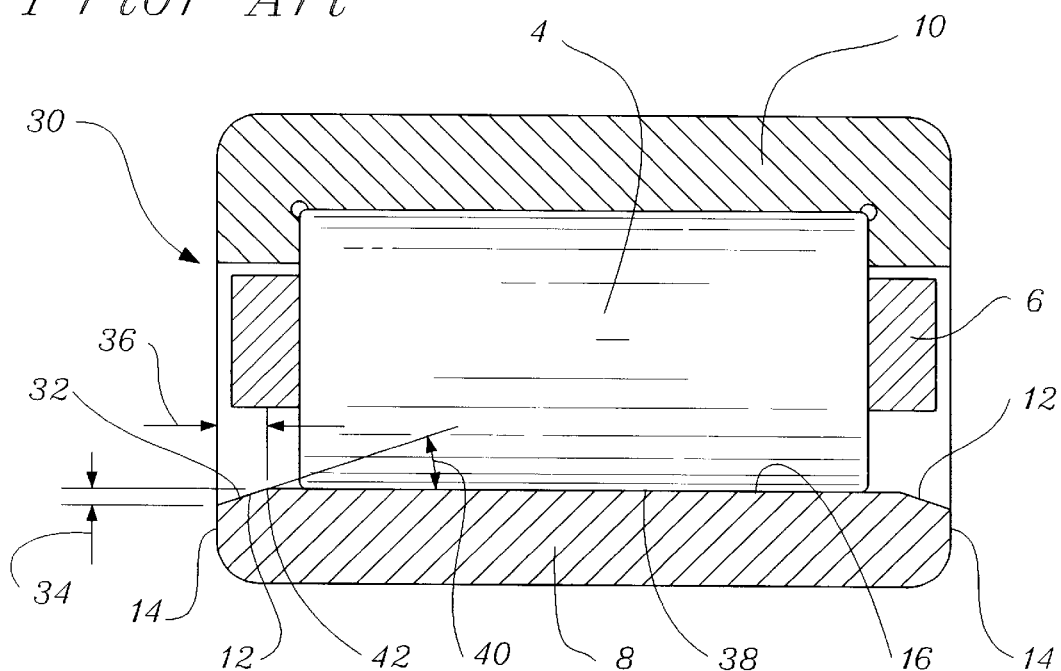
Figure 4:
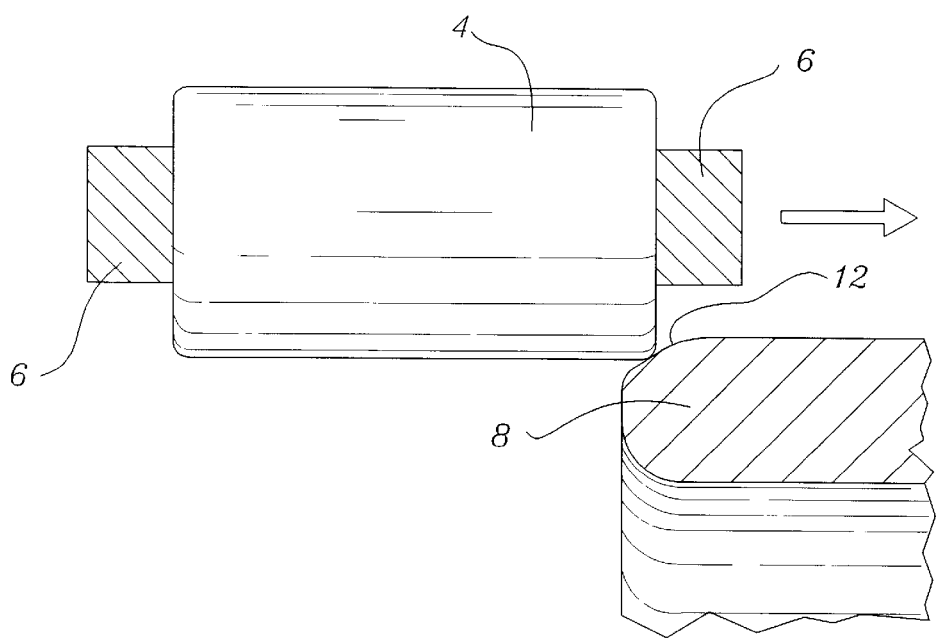
Figure 5:
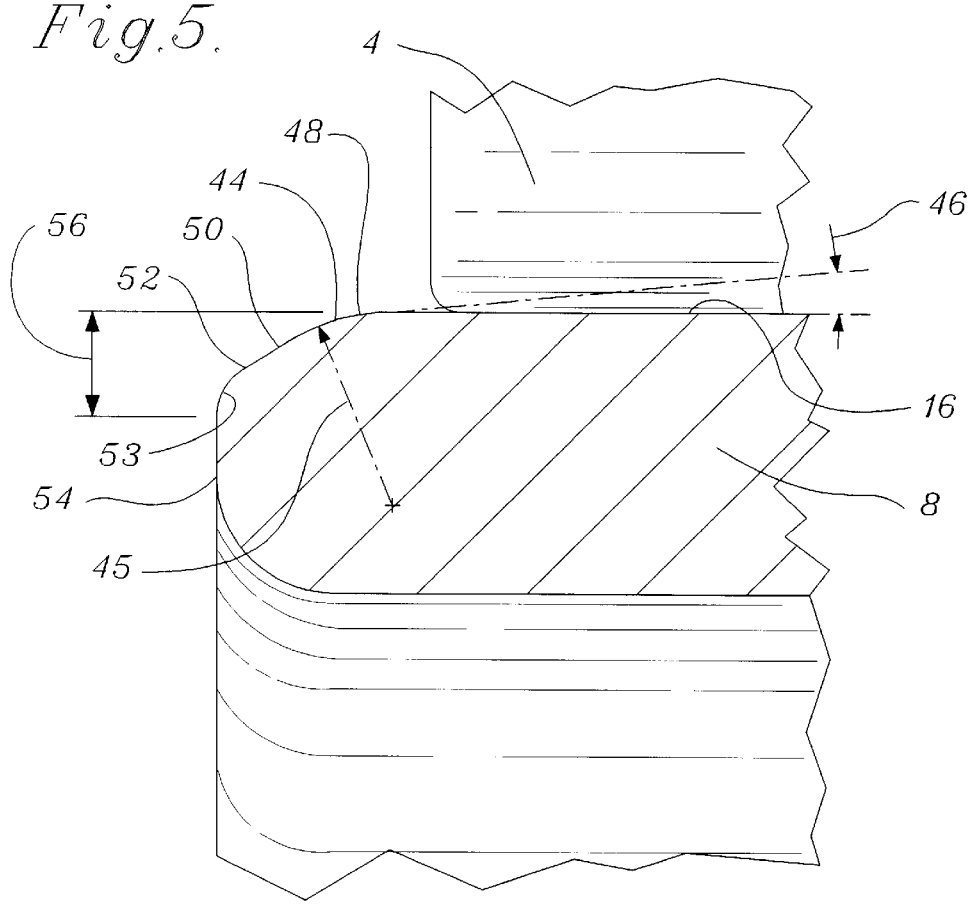
Figure 6:
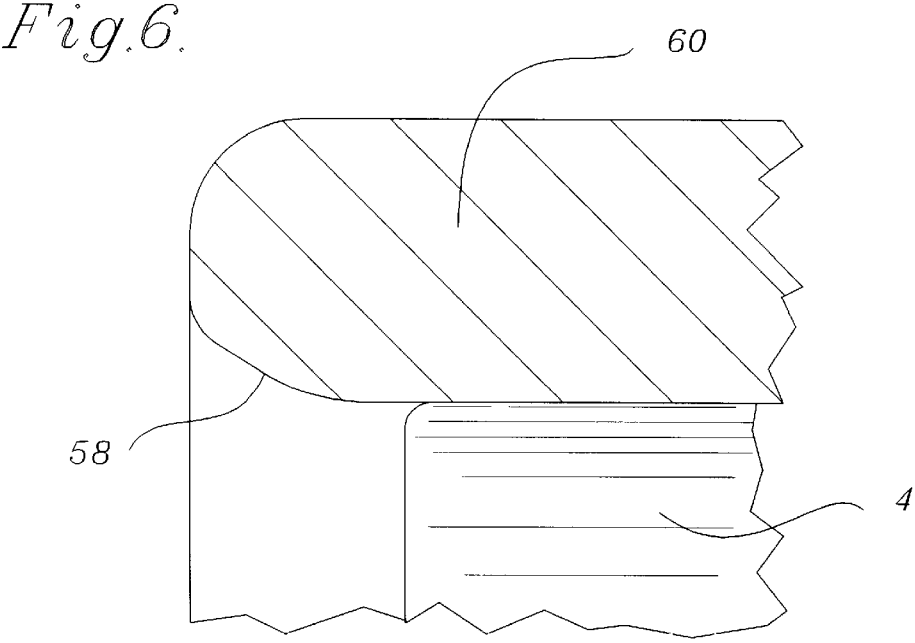
Figure 8:
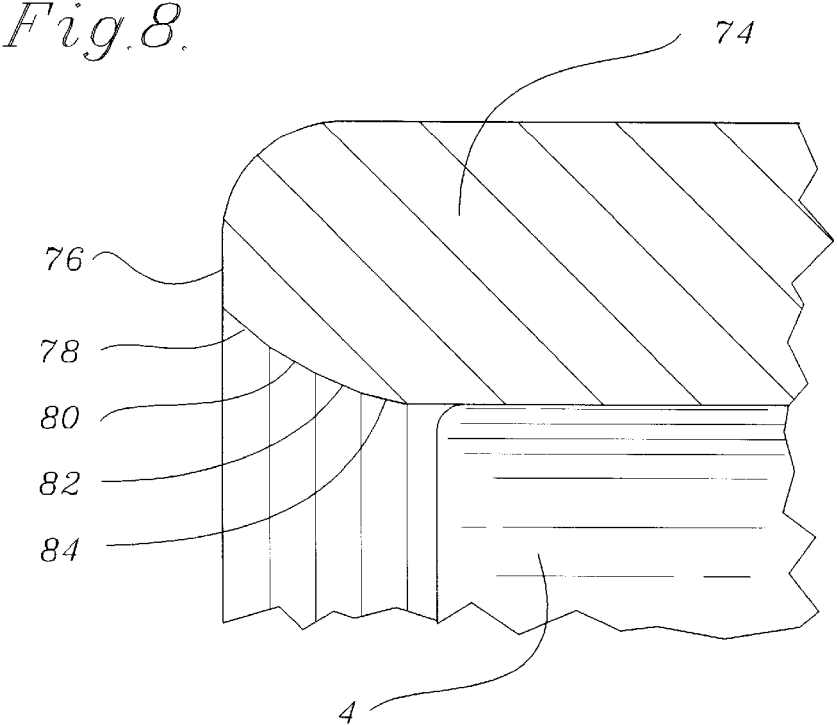
Figure 7:
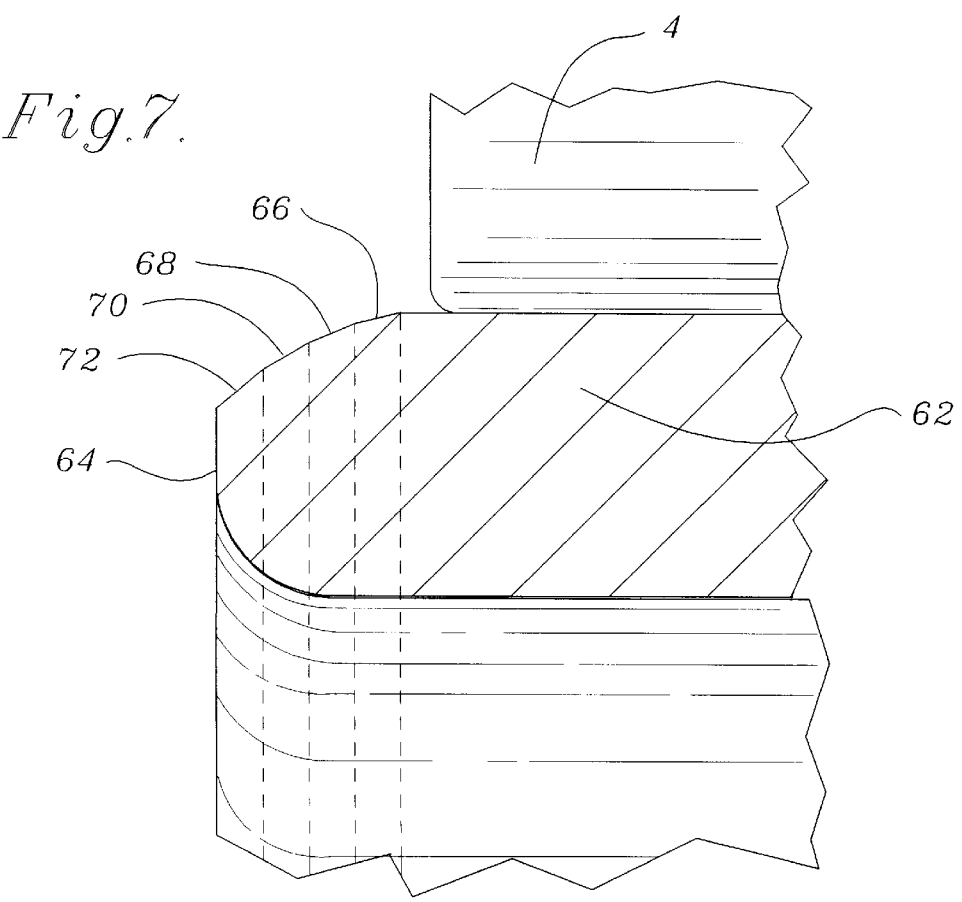

FIG. 1 An isometric view in section of a roller bearing embodying a bevel on an inner race;

FIG. 2 an isometric view in section of a roller bearing embodying a bevel on an outer race;

FIG. 3 a view in side section showing a prior art roller and inner race with a bevel;

FIG. 4 a view in side section showing the initial assembly of a roller bearing inserted relative to the inner race;

FIG. 5 a view in section showing a roller and an inner race with a curved bevel;

FIG. 6 a view in section showing a roller and an outer race with a curved bevel;

FIG. 7 a view in section showing a roller bearing and an inner race with a curved bevel with four flat surfaces; and FIG. 8 a view in section showing a roller bearing and an outer race with a curved bevel with four flat surfaces.

DETAILED DESCRIPTION OF A PREFERRED EMBODIMENT

Definitions

"Bevel" means a connecting surface between two perpendicular or nearly perpendicular surfaces. A single angular chamfer is the simplest form of bevel. For the invention it includes a curved surface. For the invention it can include four or more flat surfaces approximating a curve, but not less than four flat surfaces.

"Cage" is a bearing component which captures and separates the rolling elements of a bearing. In a cylindrical roller bearing, the cage creates a sub assembly of itself, the roller complement, and either the inner race or the outer race.

"Flanges" means projections, typically at each end of a single rollerpath bearing, which creates a channel to restrain the axial movement of the rollers.

"Inner race" means that component of a radial bearing having the smallest internal diameter which typically fits on a shaft in order to support the shaft and applied loads.

"Intersect angle" means the angle formed when two surfaces come together and end at a common point or plane.

"Outer race" means that component of a radial bearing having the largest external or outside diameter. Typically, this component fits in a housing attached to a frame of a machine.

"Radial drop" means a dimensional characteristic in polar coordinates denoting a dimensional change along a radial axis.

"Roller" means the rolling element of a bearing, which transmits a radial load from the inner race to the outer race of a bearing. In this instance, the roller has a cylindrical shape and several are used, being distributed in an angular manner in the annular space between the rollerpath of the inner race and the rollerpath of the outer race.

"Rollerpath" means a section of cylindrical surface of specific length for each specific size of bearing in which the rollers contact and roll. For an inner race, the rollerpath is an outside diameter surface. For an outer race, the rollerpath is an inside diameter surface. These surfaces may not necessarily be the largest or smallest diameters respectively if the bearing race has guide flanges.

"Slope" means the angle, with respect to the axis of a part, of a theoretical line tangent to the shape at any point along the shape.

Description

FIG. 1 shows a cylindrical roller bearing assembly 2 having a plurality of rollers 4, a cage 6 which loosely captures the roller 4, an inner race 8, and an outer race 10. In this style bearing the rollers 4, cage 6, and outer race 10 form a subassembly. The inner race 8 has an inner race bevel 12 and an inner race end face 14. The inner race 8 has an outside diameter bearing surface 16 on which the rollers 4 rest. This bearing surface serves as a rollerpath.

FIG. 2 shows a cylindrical roller bearing assembly 18 having an inner race 20, an outer race 22, and a plurality of rollers 4 loosely captured in a cage 6. In this style bearing, the rollers 4, cage 6, and inner race 20 form a subassembly. The outer race 22 has a bevel 24 and an end face 26. The outer race 22 has an inside diameter bearing surface 28 on which rollers 4 rest and serves as a rollerpath.

FIG. 3 shows a cross section roller bearing assembly 30 which is of a type found in the prior art. The roller bearing assembly 30 has a cage 6 and rollers 4 which rest on an 5 inner race outside diameter surface 16. This inner race 8 has a bevel 12 and an end face 14. The inner race outside diameter bearing surface 16 serves as a rollerpath. This inner race 8 has a traditional single angle chamfer 32 which forms a lead-in bevel at the inner race bevel 12. The invention solves the problem of increasing the amount of radial drop 34 of the inner race bevel 12 without increasing the axial dimension 36 which would 10 encroach on the rollerpath 38 which is formed as part of the inner race 8 outside diameter bearing surface 16. The roller bearing assembly 30 would be harmed if roller 4 operated or engaged over the lead-in surface (chamfer 32). The angle 40 of the inner race bevel 12 formed by chamfer 32 should not be too steep or the roller 4 will not freely slide upon it during the assembly of the bearing. Typically, lead-in bevels in the prior art have a 15 maximum chamfer angle of 30°. This would normally be the angle 40 formed by the chamfer 32 with a limit on the axial dimension 36 which causes the radial drop 34 to also be limited.

Experience shows that a roller 4 can hang-up or catch on a sharp break 42 where the inner race bevel 12 in the form of a chamfer 32 intersects the inner race outside 20 diameter bearing surface 16. When this occurs the users then tend to increase the force which is applied and this results in dents and severe scratches on these precision components and limits the useful life of them. Because there is difficulty in assembly of the parts, extra time is needed to align the machine components to facilitate assembly.

FIG. 4 illustrates the rollers 4 with a cage 6 being inserted in the initial stages with inner race 8. This illustrates the roller 4 contact with the inner race bevel 12 when the bearing assembly is being assembled.

FIG. 5 shows the invention and how it solves the geometrical and physical problems created by the prior art shown in FIG. 3.

FIG. 5 shows a schematic representation in section of an inner race 8 with a roller 4 typically of the type that is illustrated generally in FIG. 1. The inner race bevel replaces the chamfer 32 shown in FIG. 3 in the prior art with a curved surface 44 which has a radius R 45. The effective intersect angle 46 is reduced by approximately 50% from the intersect angle 40 shown in FIG. 3 of the prior art. Further, the transition from the curved surface 44 having a radius 45 is further hand blended making a smoother transition surface 48 to the inner race outside diameter bearing surface 16. This produces a smooth, uninterrupted curvature 50 which tangentially intersects a rudimentary shallow angle chamfer 52 which is further blended with a small radius 53 to the end face 54 of the inner race 8. This enables a larger radial drop 56 from the radial drop 34 shown in FIG. 3.

FIG. 6 shows an identical type bevel 58 shape for an outer race 60 as that shown in FIG. 5.

FIG. 7 shows a roller 4 with an inner race 62 having a bevel formed from an end face 64 by four flat surfaces 66, 68, 70, and 72.

FIG. 8 shows a roller 4 with an outer race 74 having a bevel formed from an end face 76 by four flat surfaces 78, 80, 82, and 84.

The bevel surfaces shown in FIGS. 5, 6, 7, and 8 are all considered as forming a curved surface which connects an end face of either an inner race to an outside diameter surface (rollerpath) of this race or which connects an end face of an outer race to an inside diameter surface (rollerpath) of this race. These shapes are considered as forming a nonlinear shape having a slope that constantly changes as one advances along the contour of the curved surface. In some cases the curved surface can simply be treated as an arc. The curved surface may also be defined by any nonlinear equation. The curved surface excludes flat surfaces of less than four flat surfaces. When one exceeds three flat surfaces, namely having four or more flat surfaces, it begins to approach or approximate a curved surface or an arc which would avoid the problems created by the prior art.

The invention can be used with roller bearings in which there are no flanges.

It is understood that the invention will encompass all mathematical curved shapes such as sine functions, parabolas, and logarithmic contours that allow a continuous change in the shape of the beveled surface which has been described in detail.

The invention requires an iterative mathematical calculation to fit within the physical restraints of each specific product. The calculation must take into account the variations in material removal on the part. Bearing races are first machined on a lathe to a greater material condition then their finished size. This is necessary to allow for the looser machine tolerances and distortions that occur in heat treating. The complex shape of the lead-in bevel is applied to the parts during the initial machining operation, making it more economical to apply. Its final form and dimensions must be correct after diameters and faces have been ground. The major use of the invention is all cylindrical roller bearings with an open or separable race. It could also be applied to any component that has to be inserted into or over another component This invention is a major advantage in larger bearings in which the combined weight of the bearing components and machine parts makes it difficult for a person to lift and move it by hand. Large equipment requires power-assisted lifting devices which are difficult to accurately position one heavy component relative to the other. The invention, because it has more radial drop, allows more tolerance in positioning in order to insert one part into the other.

While I have described presently preferred embodiments of the invention, it is to be distinctly understood that the invention is not limited thereto, but may be otherwise embodied and practiced within the scope of the following claims.

What is claimed is:

1. A cylindrical roller bearing having an inner race, an outer race, and a plurality of rollers between the races in which the improvement comprises a bevel on the inner race connecting an end face of the inner race to an outside diameter surface rollerpath of the inner race, the bevel being formed by at least four flat surfaces.

2. A cylindrical roller bearing having an inner race, an outer race, and a plurality of rollers between the races in which the improvement comprises a bevel on the outer race connecting an end face of the outer race to an inside diameter surface rollerpath of the outer race, the bevel being formed by at least four flat surfaces.

\* \* \* \* \*